United States Patent [19]

Yoshizaki et al.

[11] Patent Number: 4,814,364

[45] Date of Patent: Mar. 21, 1989

[54] INORGANIC POROUS SUBSTANCE CONTAINING RESIN COMPOSITION

[75] Inventors: Haruhiko Yoshizaki, Hadano; Norihito Kawaguchi, Tokyo, both of Japan

[73] Assignee: Nippon Steel Chemical Co., Ltd., Tokyo, Japan

[21] Appl. No.: 162,456

[22] Filed: Mar. 1, 1988

[30] Foreign Application Priority Data

Mar. 5, 1987 [JP] Japan .................................. 62-48924

[51] Int. Cl.⁴ ............................................... C08K 3/34
[52] U.S. Cl. ..................................... 523/100; 523/218; 524/445; 524/448; 524/450; 524/493; 524/505
[58] Field of Search ................. 523/100, 218; 524/505, 524/450, 445, 448, 493

[56] References Cited

U.S. PATENT DOCUMENTS

| | | | |
|---|---|---|---|
| 4,520,138 | 5/1985 | Himes | 523/218 |
| 4,556,603 | 12/1985 | Thorsrud | 523/218 |
| 4,612,342 | 9/1986 | Kostinko | 524/450 |

FOREIGN PATENT DOCUMENTS

| | | |
|---|---|---|
| 69048 | 6/1976 | Japan . |
| 98385 | 8/1979 | Japan . |

OTHER PUBLICATIONS

Derwent Abstract 77-88998y/50 Electro-Chemical (J52130852) Nov. 1977.

*Primary Examiner*—Herbert J. Lilling
*Attorney, Agent, or Firm*—Armstrong, Nikaido, Marmelstein & Kubovcik

[57] ABSTRACT

Disclosed is an inorganic porous substance-containing styrenic resin composition comprising 100 parts by weight of a styrenic resin and from 0.5 to 30 parts by weight of an inorganic porous substance. The composition is formed into packaging materials in the form of film, tray, bag or other containers, and these have an excellent freshness-keeping effect for packaging plants, especially vegetables and fruits. The effect for keeping the taste and flavor of vegetables and fruits is remarkable, and the composition of the invention is useful as a packaging material.

4 Claims, No Drawings

INORGANIC POROUS SUBSTANCE CONTAINING RESIN COMPOSITION

FIELD OF THE INVENTION AND RELATED ART STATEMENT

The present invention relates to a styrenic resin composition, and in particular, to an inorganic porous substance-containing resin composition suitable for packaging plants such and sterile due to their vegetables, fruits, etc.

Recently, there is a remarkable progress in the development of new packaging materials. Synthetic resins have various merits in that they are inexpensive and are excellent in the processability. In particular, thermoplastic resins are clean as being heated and molten in the processing step of the resins, and therefore, these are utilized in an extremely broad range. In addition, as there are many kinds of synthetic resins, the resins can be selected in accordance with the field of application. In general, synthetic resins are much used as packaging materials for the purpose of moisture-proofness or anti-corrosion as having a good gas-barrier property, but when the resins are to be applied for packaging plants such as vegetables or fruits, the high gas barrier property thereof is on the other hand a negative factor.

Accordingly, when synthetic resins are used as a packaging material for plants such as vegetables or fruits, various means are carried out for the purpose of supporting the respiration of the plants to be packaged with the synthetic resin material.

For instance, as an example of packaging fruits, some perforations are made in polyethylene bags so as to support the air-permeability of the bags, or synthetic resins are used in combination with any other highly air-permeable materials. Specifically, as a packaging material for fruits have heretofore been used various synthetic resins, including, for example, polyethylene, polypropylene, polyvinyl chloride, polyvinylidene chloride, polystyrene and the like, in the form of film, tray, container, etc. The problem in the use of these synthetic resin materials for packaging vegetables or fruits is how to control the air-permeability of the materials as mentioned above. In general, perforations are made in bags or shaped containers or the resin materials are used in combination with air-permeable pulp trays or the like, in order to support and control the air-permeability of the packaging materials. However, the means of making perforations in bags or shaped containers is disadvantageous because the process for making perforations is complicated and the freshness of vegetables or fruits packaged with such bags or containers would differ in the perforated part and the perforation free part. In addition, the means of combining synthetic resins and air-permeable materials is also disadvantageous since the packaging step is complicated and the part of the content (vegetables, fruits) in the side as contacted with the synthetic resin material would easily be bruised.

Under the situation, for the purpose of prolonging the storable period of fruits, some methods are known, for example, as disclosed in Japanese Patent Kokai Documents Nos. 69048/76 and 98385/79. More precisely, the former method (disclosed in Japanese Patent Kokai Document No. 69048/76) is to put the roots of vegetables in a bag or bag-like shaped container of a thermoshrinking film, which contains water or a water-containing substance, for preventing the flowing loss of the water, so as to keep the freshness of the vegetables packaged. The latter method (disclosed in Japanese Patent Kokai Document No. 98385/79) is to put a freshness-keeping agent, which comprises a mixture of main components of bentonite and active charcoal and adsorbent such as zeolite or the like, into a package container such as a corrugated cardboard box or the like together with fruits packaged, the said container being thereafter air-tightly sealed, so that the gas to be generated from the fruits packaged is absorbed by the freshness-keeping agent thereby to prolong the storable period of the truits.

However, the former method of packaging vegetables with keeping the roots thereof in water is disadvantageous because much labour is required for packaging and the weight of the packaged goods becomes large, although the storable period may be prolonged. The latter method is also disadvantageous because the effect could not be attained unless the freshness-keeping agent is put into the container together with the packaged fruits and air-tightly sealed therein, and therefore the packaging operation is troublesome and the resulting package becomes bulky, although the method is effective in the point that the ripening accelerating substance, such as ethylene, aldehyde or the like, which will be generated from fruits, can be removed and the over-ripening of fruits by such substance can be prevented.

Moreover, when styrenic resin or polyolefinic resin films are formed into bags or used for wrapping plant goods (vegetables, fruits) automatically or by hand operation, there is a problem of blocking by static electricity or tackiness. In order to prevent such problem, in general, an anti-static treatment is effected by incorporating an anti-static agent into the films or by coating the said agent on the films. However, any sufficient effect could not still be attained in most cases even the said anti-static treatment. On the contrary, if a large amount of such anti-static agent is used, the blocking of the resulting films would rather increase.

In order to overcome the above-mentioned problems, the present inventors earnestly studied and as a result have found that a resin composition comprising a styrenic resin and an inorganic porous substance has an extremely excellent effect for keeping the freshness of plants such as vegetables and fruits and thus have achieved the present invention.

OBJECT AND SUMMARY OF THE INVENTION

Accordingly, the object of the present invention is to provide an inorganic porous substance-containing resin composition comprising a styrenic resin composition, which is most suitable as a packaging material for keeping the freshness of plants such as vegetables and fruits for a long period of time.

Another object of the present invention is to provide an inorganic porous substance-containing resin composition which is most suitable as a packaging materials for keeping the freshness of plants such as vegetables and fruits for a long period of time, with which the freshness of plants such as vegetables and fruits can be kept for a long period of time by a simple method of directly putting the plants into the packaging bags or containers. The bags or containers made of the packaging material of the present invention do not require any additional process of making perforations in the packaging bags or containers and further do not require any complicated step of separately preparing a freshness-keeping agent and putting the said agent into the packaging bags or containers.

Still another object of the present invention is to provide an inorganic porous substance-containing resin composition which is most suitable as a packaging material having an excellent processability. In particular, the packaging material of the present invention is especially excellent in the mouth-opening easiness during manufacturing of bags or during wrapping operation.

Specifically, the subject matter of the present invention resides in an inorganic porous substance-containing resin composition comprising 100 parts by weight of a styrenic resin and from 0.5 to 30 parts by weight of an inorganic porous substance.

A styrenic resin is used in the present invention. The reason is that the styrenic resin generally has a higher gas-permeability than other resins, and in particular, a composite resin comprising the styrenic resin and an inorganic powder may have a higher gas-permeability, and accordingly, the ripening accelerating substance such as ethylene or aldehyde to be generated from vegetables and fruits can easily be removed out from the package. Further, the adsorption of the ripening accelerating substance such as ethylene or aldehyde to the inorganic porous substance as incorporated into the resin composition is easy. In addition, since the said inorganic powder-containing styrenic resin has a pertinent water-permeability, the vegetables or fruits as packaged with the packaging material made from the said resin composition would be neither moldered nor suffocated in the packaged container. Accordingly, the inorganic powder-containing styrenic resin material is especially effective for keeping the flavour of fresh vegetables and fruits.

As the styrenic resins for use in the present invention, there may be mentioned general styrenic resins of rubber component-free styrenic resins as well as rubber-modified polystyrenes, ABS resins, MBS resins, conjugated diene-aromatic vinyl bloch copolymers, etc. Among them, a conjugated diene-aromatic vinyl block copolymer or a mixture of a conjugated diene-aromatic vinyl block copolymer and a rubber component-free styrenic resin is preferred.

The rubber component-free styrenic resins include styrene homo-polymers and copolymers of styrene and a monomer copolymerizable with styrene, which are, for example, polystyrene, styrene-vinyl toluene copolymer, styrene-$\alpha$-methyl-styrene copolymer, styrene-methyl methacrylate copolymer, styrene-acrylonitrile copolymer, etc.

The conjugated diene-aromatic vinyl block copolymers for use in the present invention include the followign substances.

First, there are branched block copolymers, in which the content of the conjugated diene being 40% or less, of a general formula $(A-B)_xY$ (in which A represents an aromatic vinyl polymer block; B represents a conjugated diene polymer block; Y represents atom(s) derived from a polyfunctional treating agent to be used for formation of a branched radial polymer; and x represents a number of the functional groups of the said polyfunctional treating agent and is an integer at least 3 or more). In the branched block copolymers, the aromatic vinyl polymer block A includes, for example, polymer blocks formed from anyone of vinyl aromatic compounds such a styrene, $\alpha$-methylstyrene, vinyltoluene, etc.; the conjugated diene polymer block B includes, for example, polymer blocks formed from anyone of conjugated diene compounds such as butadiene, isoprene, etc.; the atom(s) Y is (are) a central atom or a central atomic group for the branched block copolymer, which is derived from a polyfunctional treating agent to be used for formation of radial polymers, for example, polyepoxides, polyketones or tin compounds such as tetra-allyl tin or stannic fluoride; and x is an integer of at least 3, preferably 4 or more. The proportion of the aromatic vinyl polymer block A to the conjugated diene polymer block B can be varied in a broad range, but the content of the conjugated diene polymer block B is preferably from 40 to 10% by weight.

Second, there are styrenic resin compositios comprising a mixture of from 20 to 80 parts by weight of the above-mentioned branched block copolymer and from 80 to 20 parts by weight of a rubber component-free styrenic resin.

Third, there are styrenic resin compositions comprising a mixture of from 5 to 40 parts by weight of a linear block copolymer of a general formula $(A-B)_n$ or $(A-B)_n-A$ (in which A represents an aromatic vinyl polymer block; B represents a conjugated diene polymer block; and n represents a positive integer), the content of the conjugated diene being 40% or more, and from 95 to 60 patrts by weight of a rubber component-free styrenic resin. In the said linear block copolymers, the aromatic vinyl polymer block A and the conjugated diene polymer block B are polymer blocks constituted by anyone of the same compounds as those in the above-mentioned branched block copolymers; and n is preferably 1 or 2.

Fourth, there are ternary mixtures comprising from 5 to 15 parts by weight of the above-mentioned branched block copolymer, from 15 to 35 parts by weight of the above-mentioned linear block copolymer and from 50 to 80 parts by weight of a rubber component-free styrenic resin.

The composition of the present invention comprises 100 parts by weight of the above-mentioned styrenic resin and from 0.5 to 30 parts by weight of an inorganic porous substance.

The inorganic porous substance for use in the present invention includes cristobalite, diatomaceous earth, activated clay, acidic terra abla, zeolite, silica gel and the like, and the mixture thereof, having micro pores with a pore size of from 10 to 1,000 Å. The content of the said substance is from 0.5 to 30 parts by weight, more preferably from 3 to 20 parts by weight, to 100 parts by weight of the styrenic resin. If the amount of the said substance to be incorporated is less than 0.5 part by weight, the freshness-keeping effect would not be sufficient. On the contrary, if it exceeds 30 parts by weight, the processability would become poor and the mechanical strength would be lowered. The inorganic porous substance is so adjusted that the particle size may fall within the range of from 1 to 100 $\mu$m, preferably from 3 to 20 $\mu$m. Although the inorganic porous substance can directly be used as such, this is preferably fired at 200° to 1,000° C. before use. Further, the substance may be subjected to acid treatment for surface activation. Moreover, the particles of the substance may be coated with a resin, a metal soap, etc., for the purpose of improving the dispersability. In addition, other additives, such as antistatic agent, plasticizer, inorganic pigment, dye, lubricant, etc., can also be added to the substance, if desired.

The inorganic porous substance may contan a silver salt, which is generally known as a germicide, in the pores thereof, so that the composition of the present invention may be a freshness-keeping agent having a germicidal activity. In order to obtain such silver salt-containing porous substance by a simple method, the inorganic porous substance may be dispersed in an aqueous silver salt solution such as an aqueous silver nitrate solution, etc., and then the resulting porous substance is dried to obtain the intended germicidal substance with ease.

According to the present invention, provided is a resin composition which is suitable for manufacture of a packaging material for plants such as vegetables and fruits. Using the packaging material, plants such as vegetables and fruits can be packaged for storage for a long period of time without necessity of any superfluous labour or complicated processing, and in particular, vegetables and fruits can be stored with the packaging material for a long period of time without losing the taste and flavor thereof.

DETAILED DESCRIPTION OF THE PREFERRED EMBODIMENT

The present invention will be explained concretely hereinafter, on the basis of examples and comparative examples.

EXAMPLES 1 TO 11 AND COMPARATIVE EXAMPLES 1 TO 12

As a styrenic resin was used a rubber component-free GP-polystyrene (ESTYRENE G-10, trade name by Nippon Steel Chemical Co., Ltd.), a branched styrene-butadiene block copolymer with butadiene content of 25% by weight (K-Resin KR-03, trade name by Phillips Petroleum Co.) or a linear butadiene-styrene block copolymer with butadiene content of 60% by weight (TUFPRENE, trade name by Asahi Chemical Industry Co.).

As an inorganic porous substance was used a natural porous silica having a pore size of from 15 to 200 Å and a mean particle size of 20 μm (NPS, CRYSVARL, trade name by Nittetsu Mining Co.) or a fired diatomaceous earth having a pore size of from 200 to 1,000 Å and a mean particle size of 5 μm (B-DE, KUNILITE, trade name by Kunimine Industries Co.).

The above-mentioned resin and inorganic porous substance were blended in the proportion shown in Table 2 to 5 below and kneaded with a Banbury mixer at 150°–180° C. for 5 minutes to form pellets. Thus the inorganic porous substance-containing resin composition of Examples 1 to 11 were obtained.

Next, the pellets of Examples 1 to 11 thus prepared were extruded through a blown-film extruder having a screw diameter of 40 mm, the cylinder temperature being 180° to 220° C. and the blown-film die temperature being 180° to 200° C., to give blown tubes having a size of 45 μm thickness and 500 mm width. The blown tubes were formed into bags having a size of 700 mm length, using an impulse heat-sealing machine.

The blocking property of the bags was evaluated on the basis of three ranks, by means of opening the mouth part of the bag by pinching with fingers. In the three ranks, "O" means that the mouth could easily be opened with no resistance; "Δ" means that the mouth could be opened with some resistance; and "X" means that the mouth could hardly be opened. The results obtained are shown in Table 2.

The vegetables or fruits shown in Table 1 were put in the bags and the mouth of the respective bags was bent and the bags were packaged in a corrugated cardboard box. The box was stored in a room having a room temperature of 23° C. and a relative humidity of 50%. After stored for a determined period of time, the bags were taken out and the vegetables and fruits were examined by functional test, appearance test and weight measurement. Thus the freshness-keeping effect of the respective bags was evaluated and compared with one another. The results are shown in Tables 2 and 5.

TABLE 1

|  | Weight | Amount Put in Bag | Period of Storage |
|---|---|---|---|
| Spinach | About 300 g/bunch | 3 (bunches) | 4 days |
| Tangerine | About 150 g | 10 | 20 days |
| Tomato | About 180 g | 7 | 10 days |
| Green pepper | About 40 g | 10 | 14 days |

For comparison, comparative tests were carried out as follows: In Comparative Examples 1, 5, 8 and 11, the vegetables and fruits were directly put in the aforesaid corrugated cardboard box and stored. In Comparative Example 2, a composition comprising a talc (mean particle size 5 μm; manufactured by Hayashi Chemical Industry Co.), which is a non-porous inorganic powder, and K-Resin was used. In Comparative Examples 3, 6 and 9, K-Resin containing no inorganic powder was used. In Comparative Examples 4, 7, 10 and 12, a low density polyethylene (LD.PE) was used. In these Comparative Examples, the resin composition or the resin was filmed and then formed into bags in the same manner as mentioned above, and the above-mentioned vegetables and fruits were put in these bags and the freshness-keeping test was carried out in every case in the same manner as above. The results obtained are shown in Tables 2 to 5.

In this freshness-keeping test, the functional test was expressed by three-rank evaluation in which the vegetables or fruits stored under the above-mentioned condition were compared woth the corresponding fresh ones. In the evaluation, "O" means no change in the taste and flavour of the vegetables or fruits stored; "Δ" means that the taste and flavour somewhat changed; and "X" means that the taste and flavour extremely changed. The appearance test was also expressed by three-rank evaluation in which "O" means no change in the appearance of the vegetables or fruits stored; "Δ" means that the appearance somewhat changed; and "X" means that the appearance extremely changed. These functional test and appearance test were carried out by three panelists who consulted together. The weight change was evaluate on the basis of the weight reduction calculated as follows:

Weight Reduction (wt. %) =

$$\frac{(\text{Weight before Test}) - (\text{Weight after Test})}{(\text{Weight before Test})} \times 100$$

Accordingly, the total evaluation of the freshness-keeping effect was expressed by three-rank evaluation, in which "O" means good, "Δ" means somewhat good, and "X" means bad (no effect).

The results of Tables 2 and 5 apparently demonstrate that the styrenic resin compositions of Examples 1 to 11, which contained silica series natural porous mineral or fired diatomaceous earth, were excellent for keeping freshness of vegetables and fruits.

aromatic vinyl branched block copolymer constitutes at least 5 parts by weight per 100 parts sty-

TABLE 2

| No. | Resin Composition | | | Blocking Property | Freshness-keeping Test (Green pepper) | | | Total Evaluation |
|---|---|---|---|---|---|---|---|---|
| | Resin Used | Inorganic Powder | | | Taste and Flavour | Appearance | Weight Reduction (wt. %) | |
| | | Kind | Amount(*1) | | | | | |
| Example 1 | PS/T = 80/20 | NPS | 5 | O | O | O | 3.0 | O |
| Example 2 | K-Resin | NPS | 5 | O | O | O | 3.1 | O |
| Example 3 | PS/K = 20/80 | NPS | 15 | O | O | O | 3.3 | O |
| Example 4 | K-Resin | B-DE | 20 | O | O | O | 3.6 | O |
| Comparative Example 1 | (Directly put in corrugated cardboard box without packaged, for control test) | | | — | X | X | 51.0 | X |
| Comparative Example 2 | K-Resin | Talc | 15 | Δ | Δ | O | 2.5 | Δ |
| Comparative Example 3 | K-Resin | None | — | X | Δ | O | 2.5 | Δ |
| Comparative Example 4 | LD.PE | None | — | Δ | X | Δ | 2.0 | X |

(Notes)
(*1)The amount means parts by weight to 100 parts by weight of the resin.
PS: GP-polystyrene, T: TUFPRENE K: K-Resin, LD.PE: Low Density Polyethylene NPS: Natural Porous Silica, B-DE: Burnt Diatomaceous Earth

TABLE 3

| No. | Resin Composition | | | Freshness-keeping Test (Spinach) | | | Total Evaluation |
|---|---|---|---|---|---|---|---|
| | Resin Used | Inorganic Powder | | Taste and Flavour | Appearance | Weight Reduction (wt. %) | |
| | | Kind | Amount(*1) | | | | |
| Example 5 | K-Resin | NPS | 5 | O | O | 2.3 | O |
| Example 6 | K-Resin | B-DE | 20 | O | O | 2.4 | O |
| Comparative Example 5 | (Directly put in corrugated cardboard box without packaged, for control test) | | | X | X | 17.0 | X |
| Comparative Example 6 | K-Resin | None | — | Δ | Δ | 1.5 | Δ |
| Comparative Example 7 | LD.PE | None | — | X | Δ | 1.2 | X |

(Notes)
The amount(*1) and the abbreviations of the ingredients are same as those in Table 2.

TABLE 4

| No. | Resin Composition | | | Freshness-keeping Test (Tangerine) | | | Total Evaluation |
|---|---|---|---|---|---|---|---|
| | Resin Used | Inorganic Powder | | Taste and Flavour | Appearance | Weight Reduction (wt. %) | |
| | | Kind | Amount(*1) | | | | |
| Example 7 | K-Resin | NPS | 5 | O | O | 1.9 | O |
| Example 8 | K-Resin | B-DE | 20 | O | O | 2.2 | O |
| Comparative Example 8 | (Directly put in corrugated cardboard box without packaged, for control test) | | | X | X | 9.4 | X |
| Comparative Example 9 | K-Resin | None | — | Δ | O | 1.3 | Δ |
| Comparative Example 10 | LD.PE | None | — | X | Δ | 0.8 | X |

(Notes)
The amount(*1) and the abbreviations of the ingredients are same as those in Table 2.

TABLE 5

| No. | Resin Composition | | | Freshness-keeping Test (Tomato) | | | Total Evaluation |
|---|---|---|---|---|---|---|---|
| | Resin used | Inorganic Powder | | Taste and Flavour | Appearance | Weight Reduction (wt. %) | |
| | | Kind | Amount(*1) | | | | |
| Example 9 | PS/T = 80/20 | NPS | 5 | O | O | 0.8 | O |
| Example 10 | K-Resin | NPS | 5 | O | O | 1.2 | O |
| Example 11 | PS/T = 80/20 | NPS | 15 | O | O | 1.9 | O |
| Comparative Example 11 | (Directly put in corrugated cardboard box without packaged, for control test) | | | X | X | 7.5 | X |
| Comparative Example 12 | LD.PE | None | — | X | X | 0.4 | X |

(Notes)
The amount(*1) and the abbreviations of the ingredients are same as those in Table 2.

What is claimed is:

1. An inorganic porous substance-containing resin composition for use as a packaging material for the preservation of perishable fruits and vegetables, comprising:
   (a) 100 parts by weight of a styrenic resin selected from the group consisting of conjugated diene-aromatic vinyl branched block copolymers, and mixtures of conjugated diene-aromatic vinyl branched block copolymers with rubber component-free styrenic resin wherein said diene-aromatic vinyl branched block copolymer constitutes at least 5 parts by weight per 100 parts styrenic resin; and
   (b) from 0.5 to 30 parts by weight of an inorganic porous substance selected from the group consisting of cristobalite, diatomaceous earth, activated clay, acidic terra abla, zeolite, and mixtures thereof, having a pore size of from 10 to 1,000 angstroms.

2. An inorganic porous substance-containing resin composition for use as a packaging material for the preservation of perishable fruits and vegetables according to claim 1 wherein said inorganic porous substance has a particle size of 1 to 100 micrometers.

3. An inorganic porous substance-containing resin composition as claimed in claim 1, wherein the conjugated diene-aromatic vinyl branched block copolymer is one, in which the content of the conjugated diene being 40% or less, of a formula:

$$(A-B)_xY$$

in which A represents an aromatic vinyl polymer block; B represents a conjugated diene polymer block; Y represents atom(s) derived from a polyfunctional treating agent to be used for formation of a branched radial polymer; and x represents a number of the functional groups of the said polyfunctional treating agent and is an integer of at least 3 or more.

4. An inorganic porous substance-containing resin composition for use as a packaging material for the preservation of perishable fruits and vegetables according to claim 1 wherein said inorganic porous substance is present in an amount of 4 to 20 parts by weight per 100 parts by weight of styrenic resin.

* * * * *